May 15, 1934.  F. M. REID  1,958,926
TRANSPORTATION OF AUTOMOBILES
Filed Feb. 2, 1934

INVENTOR
Frederick M. Reid

Patented May 15, 1934

1,958,926

UNITED STATES PATENT OFFICE 1,958,926

TRANSPORTATION OF AUTOMOBILES

Frederick M. Reid, Detroit, Mich., assignor to Fruehauf Trailer Company, a corporation of Michigan Application February 2, 1934, Serial No. 709,524

1 Claim. (Cl. 280—33.1)

The invention relates to methods of loading automobiles upon a semi-trailer adapted for their transport.

It is an object of the invention to provide a method of loading three automobiles for transportation in such a manner that they can be carried in considerably less over-all space than is possible with heretofore known methods. The term "automobile" is herein used in its broad sense and includes passenger cars, trucks, chassis with cab, etc. By "higher portion" of an automobile is meant that portion which requires the greater clearance height, i. e. ordinarily the cab end of a truck, or the rear end of a passenger automobile.

To the accomplishment of the foregoing and related ends, the invention, then, consists of the method hereinafter fully described and particularly pointed out in the claim, the annexed drawing and the following description setting forth in detail certain methods of carrying out the invention.

In said annexed drawing:—

Figure 1:
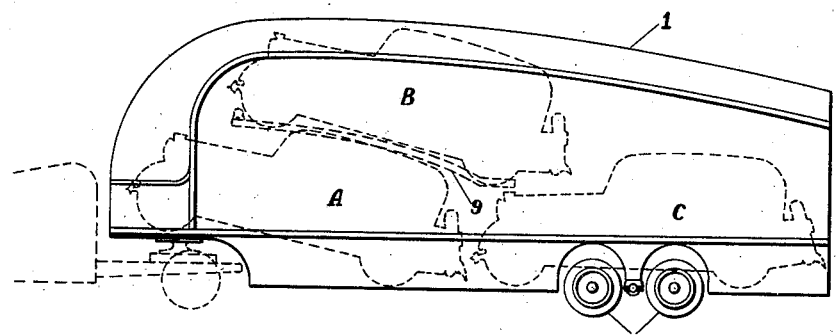
Figure 1 is a side elevation of a completely enclosed semi-trailer showing diagrammatically my method for arranging three automobiles upon a semi-trailer.

My method of arranging three automobiles for transportation on a semi-trailer comprises first placing at the one end of said vehicle an automobile with its higher portion toward the center of the vehicle, and with the set of wheels at the end of its lower portion elevated with respect to the set of wheels at the end of its higher portion; placing a second automobile with its lower portion substantially above the higher portion of the first placed automobile, with its higher portion substantially at the longitudinal center of the vehicle, and with the set of wheels at the end of its higher portion depressed with respect to the set of wheels at the end of its lower portion and extending at least partially below the normal top level of the first placed automobile; and then placing a third automobile with its lower portion endwardly adjacent the higher portion of the first placed automobile, said lower portion extending at least partially below the higher portion of the said second automobile.

Referring to the drawing:—

Figure 2:
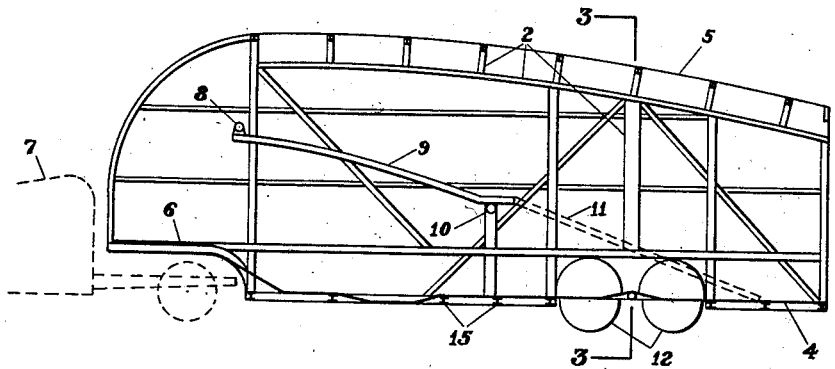
Figure 2 is a longitudinal sectional elevation of the semi-trailer shown in side elevation in Figure 1.
Figure 3:
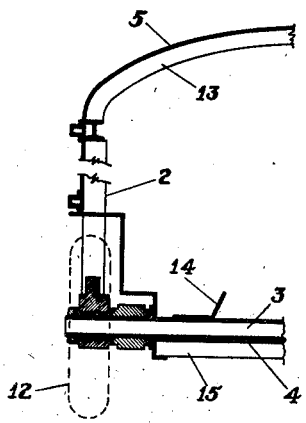
Figure 3 is a transverse section on the line 3—3 of Figure 2.

In Figure 1 is shown a completely enclosed semi-trailer having a body 1 comprising, as shown in Figures 2 and 3, on each side of the body, a side framework 2 carried terminally upon the axle 3, a floor 4, and a roof 5. Figure 3 shows the arrangement of the transverse cross-members 15 carried by the side frames 2, which members in turn carry the floor 4. In Figure 3 there is also shown the relationship between the cross-members 13 supporting the roof 5 and the side frames 2. In Figure 3 the guide wells 14 in the floor 4 for the wheels of the automobiles to be carried are also shown. Referring to Figure 2, the side frame 2 is cut away at its lower forward end to provide a raised portion 6 adapted to be supported upon a pulling vehicle 7. At the point 8 on the side frame 2 there is pivoted, substantially endwardly, the ramp 9 which is adapted to movement so that its free end can be lowered to rest upon the removable cross-member 10 to permit automobile B to be driven thereon over removable skids 11. Means (not shown) are provided to hold the free end of the ramp 9 substantially at the roof 5 when the automobile A is being loaded. In Figure 3 the side frames 2 are shown carried terminally on the axle 3 substantially aligned transversely with the tandem wheels 12. The floor 4 carried by the side frames 2 lies below the level of the axle 3.

In Figure 1 is shown the arrangement obtained by the carrying out of my hereinbefore described method of loading three automobiles upon the semi-trailer illustrated in the above described figures. The free end of the ramp 9 is swung up and fastened at the roof, after which the automobile A is run in upon the floor 4 with the set of wheels at the end of its lower portion resting upon the raised portion 6 of the floor 4. After this automobile is in position and has been suitably fastened, the removable cross-member 10 is put in position and the free end of the ramp 9 lowered to rest thereon. The removable skids 11 are then placed in a sloping position with their upper ends registering with the lower end of the ramp 9 and the automobile B is then run upon the ramp with its lower portion substantially above the higher portion of the automobile A, and suitably fastened. The automobile C is then placed upon the floor 4 with its lower portion endwardly adjacent the higher portion of the automobile A.

It is apparent from the foregoing description that my invention provides a method of loading three automobiles upon a semi-trailer, particularly a completely enclosed semi-trailer, which makes possible the carrying of the same within the minimum of length and height. A distinct advantage accrues to my method of loading because all the automobiles are loaded by driving directly ahead, there is no backing in required. Also in loading automobile B the driver can see the radiator cap thereof and can therefore judge exactly how far to drive in to bring this cap to the right distance below the roof of the semi-trailer.

Other modes of applying the principle of my invention may be employed instead of those explained, change being made as regards the means herein disclosed, provided the method stated by the following claim, or the equivalent of such stated method be employed.

I therefore particularly point out and distinctly claim as my invention:—

The method of loading three automobiles on a vehicle for their transport which comprises; first placing at the one end of said vehicle an automobile with its higher portion toward the center of the vehicle, and with the set of wheels at the end of its lower portion elevated with respect to the set of wheels at the end of its higher portion; placing a second automobile with its lower portion partially above the higher portion of the first placed automobile, with its higher portion substantially at the longitudinal center of the vehicle, and with the set of wheels at the end of its higher portion depressed with respect to the set of wheels at the end of its lower portion and extending at least partially below the normal top level of the first placed automobile; and then placing a third automobile with its lower portion endwardly adjacent the higher portion of the first placed automobile.

FREDERICK M. REID.